United States Patent [19]

Carpenter et al.

[11] Patent Number: 4,978,218
[45] Date of Patent: Dec. 18, 1990

[54] FOLDING ARM FOR OVERHEAD PROJECTOR

[75] Inventors: Robert S. Carpenter; Dennis J. Roden, Ernesto M. Rodriguez, all of Austin, Tex.

[73] Assignee: Minnesota Mining and Manufacturing Company, St. Paul, Minn.

[21] Appl. No.: 486,971

[22] Filed: Mar. 1, 1990

[51] Int. Cl.⁵ .............................................. G03B 21/00
[52] U.S. Cl. ............................ 353/119; 353/DIG. 4; 353/66; 353/72
[58] Field of Search ............................ 353/119, 65–67, 353/72, DIG. 3, DIG. 4, DIG. 6

[56] References Cited

U.S. PATENT DOCUMENTS

| | | |
|---|---|---|
| 2,496,647 | 2/1950 | Woodbury ............... 353/DIG. 3 X |
| 3,653,754 | 4/1972 | Yamanaka . |
| 3,870,411 | 3/1975 | Schwartz et al. . |
| 4,449,800 | 5/1984 | De Longis et al. . |
| 4,588,271 | 5/1986 | Emura . |
| 4,636,050 | 1/1987 | Tohata et al. . |
| 4,696,557 | 9/1987 | Tomizuka . |
| 4,728,184 | 3/1988 | Kyhl . |
| 4,824,239 | 4/1989 | Sekine . |

FOREIGN PATENT DOCUMENTS 1168485 6/1984 Canada ......................... 353/DIG. 3

Primary Examiner—Harry N. Haroian
Attorney, Agent, or Firm—Donald M. Sell; Walter N. Kirn; Jack V. Musgrove

[57] ABSTRACT

A portable overhead projector having a folding arm. The arm and a torque member are pivotally attached to the projector head, forming a four bar linkage. When the arm is moved from an upright, operative position to a storage position, the projector head rotates so as to be flush with the base of the projector, making the projector more compact for storage. An adjustment mechanism is also provided to automatically open and close a mirror which is attached to the projector head, simplifying the set up procedure of the overhead projector.

20 Claims, 3 Drawing Sheets

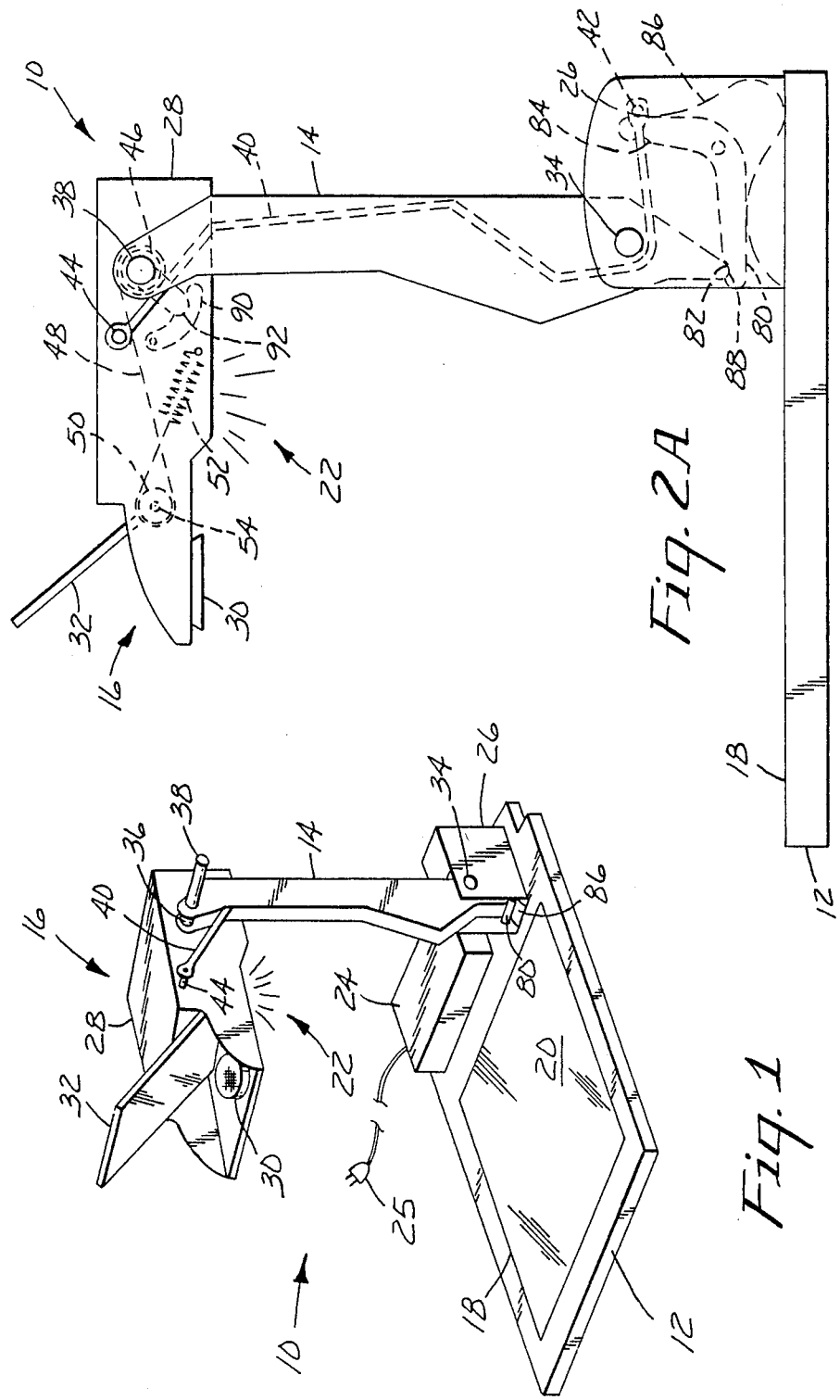

FOLDING ARM FOR OVERHEAD PROJECTOR

BACKGROUND OF THE INVENTION

1. Field of the Invention

The present invention generally relates to image projection systems, and more particularly to a portable overhead projector which collapses into a flat state in a single step.

2. Description of the Prior Art

Overhead projectors are widely used for educational and training purposes in schools and businesses, particularly in presenting visual aids during lectures. Such projectors generally comprise a base, a light source (with associated control electronics), and a projector head positioned above the base, housing an optical lens and mirror system. In the simplest form, the base includes a transparent window or stage, and the light source, typically an incandescent lamp, is placed below the stage. In this manner, when a transparency containing a visual image is placed on the stage, light from the lamp passes through the transparency, is focused by the lens in the projector head, and then displayed on a screen or wall. This type of projector is appropriately referred to as a transmissive projector.

Some projectors are used only at a single location, but it is often necessary to carry a projector from site to site. Therefore, it is desirable to provide a portable projector which is relatively compact and conveniently transported. One manner in which a projector may be made more compact is by providing a reflective base, instead of a transmissive base. In this construction, the base is very thin and the stage resting on the base comprises a reflective surface, such as a Fresnel mirror. The light source is placed in the projector head, with a lens collecting and directing the light toward the stage area. When a transparency is placed on the stage, light from the projector head passes through the transparency, is reflected and condensed by the Fresnel mirror, and passes up through the transparency a second time, then being focused and displayed by the lens and mirror within the projector head. This type of projector is referred to as a reflective projector.

While reflective projectors reduce the depth of the base, these units are still difficult to transport due to the projector head extending above the base. Projector heads have accordingly been devised which collapse or fold toward the base, further reducing the profile of the projector for transportation and storage. The easiest way to achieve this is by pivotally connecting the support arm of the projector head to the base. The head may then be swung over, or next to, the base for portability. For example, in U.S. Pat. No. 4,449,800 issued to De Longis et al. on May 22, 1984, the support arm hinges at the edge of the base, and the projector head actually detaches from the support arm.

Several variations of this design have been constructed, one of which is illustrated in U.S. Pat. No. 4,824,239 issued to T. Sekine on Apr. 25, 1989. In that device, two support arms are fixed to an axle which is rotatably mounted to the base. The projector head is also pivotally mounted to the support arms. When collapsing the projector, the head is first swung down and tucked between the support arms. The axle is then rotated, placing the head flush with the base. The device includes mechanisms to lock the arms and head into place when the projector is set up for use. A similar designed is disclosed in U.S. Pat. No. 4,588,271 issued to B. Emura on May 13, 1986. The support arm may have two or more pivoting joints as described in U.S. Pat. Nos. 3,653,754 (issued to E. Yamanaka on Apr. 4, 1972) and 4,696,557 (issued to M. Tomizuka on Sept. 29, 1987).

Another technique for optimizing the shape of the collapsed projector involves the construction of the projector head itself. The height of a standard projector head is increased by the presence of the mirror which is used to redirect the visual image to a vertical surface, i.e., a screen. The mirror must be oriented at an inclination of approximately 45° to achieve this effect. It has been found, however, that the mirror may be pivotally mounted to the head itself, and folded down when not in use. This construction is used in prior art devices, including that shown in U.S. Pat. No. 4,824,239, and greatly diminishes the height of the head.

One disadvantage in the use of the foregoing projectors involves the multiple steps that are necessary in setting up or collapsing the projector. Because the set up is often done in the presence of the audience, it is highly desirable that this procedure be as simple as possible, so as to reinforce the image of the operator as a competent and professional person. If the operator is fumbling with the projection device, this will undoubtedly detract from the presentation. If, on the other hand, the operator is quickly and adroitly able to set up the projection equipment, this will enhance the overall effectiveness of the presentation. This is especially important when the operator is not familiar with the projector.

One overhead projector, manufactured by Liesegang Co. of West Germany, improves upon the prior art in this regard. That device includes a support arm comprised of upper and lower sections which are coupled together by a knee joint having a pull ring. The lower section is connected to the base, and the upper section is connected to the projector head. When the ring on the knee is pulled, the upper and lower sections of the support arm fold together, bringing the head flush with the base, over the stage area. A gear system inside the sections maintains the projector head in a horizontal orientation throughout the movement. After the mirror is folded downward, the device may be placed in protective luggage for transportation. This design, therefore, simplifies set up and collapsibility.

The Liesegang overhead projector, however, still requires two steps in the set up of the device, since the mirror must be manually adjusted. In fact, a user of that device who is not familiar with the projector head optics might not even realize that the mirror must be raised when setting the projector up. Unfortunately, there are no prior art portable projectors that provide for automatic adjustment of a movable projector head mirror. It would, therefore, be desirable and advantageous to devise a portable overhead projector which may be completely set up, or collapsed, in a single step.

SUMMARY OF THE INVENTION

The foregoing objective is achieved in a portable overhead projector having a folding arm. The arm is pivotally connected to the base, and is part of a four-bar linkage which includes the housing of the projector head. To collapse the unit, a handle on the arm is pushed; the arm folds down toward the base, and the four-bar linkage, including the arm, simultaneously rotates the projector head 180°. The projector head and arm are then laid flush against the base, reducing the overall height of the unit for transportation and storage. During this operation, a pulley system inside the projector head automatically closes the mirror which is pivotally attached to the projector head. When the projector is to be set up, the same handle is simply pulled upward; the arm is raised to an upright position, the projector head rotates to its operational state, and the mirror on the head flips up.

BRIEF DESCRIPTION OF THE DRAWINGS

The novel features of the invention are set forth in the appended claims. The invention itself, however, will best be understood by reference to the accompanying drawings, wherein:

FIG. 1 is a perspective view of a portable overhead projector constructed according to the present invention.

FIGS. 2A through 2C are side elevational views of the present invention depicting the movement of the folding arm, projector head and mirror.

Figure 2B:
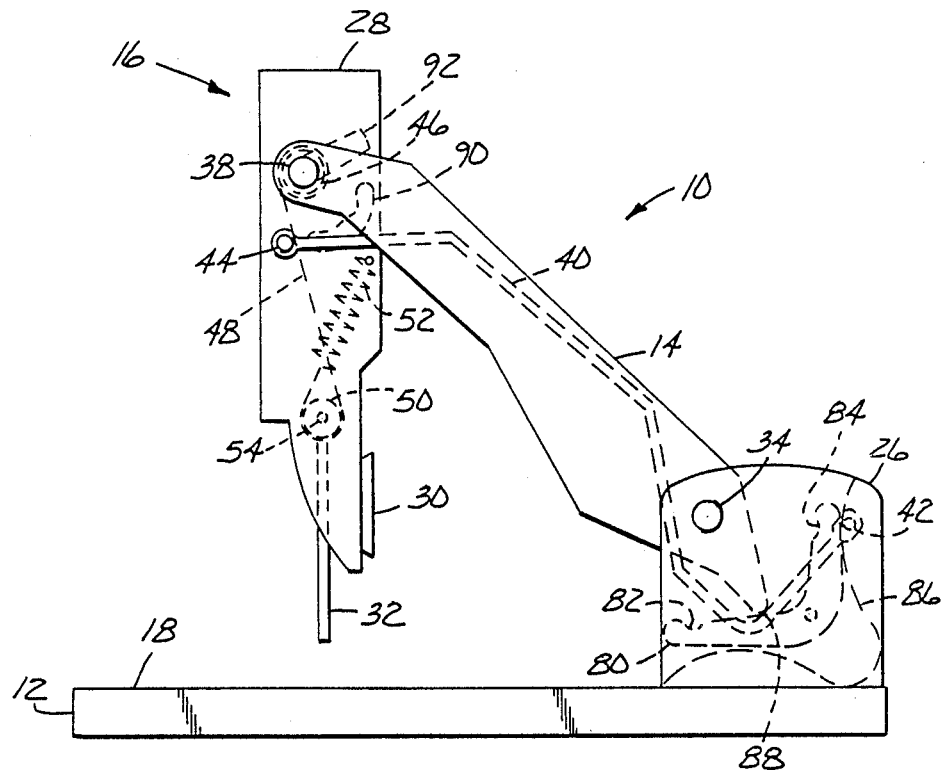

In reflective-type projectors, the light source 22 is usually contained in projector head 16. Light source 22 is typically an incandescent lamp. Base 12 may have an enclosure 24 thereon for accommodating the electronics used to regulate light source 22. A plug 25 is also provided for connection to a standard 120 volt or 220 volt AC power source. Base 12 further has a mounting block 26 for receiving the lower end of folding arm 14. The details of folding arm 14 are discussed below in conjunction with FIGS. 2A through 2C. Projector head 16 includes a housing 28 which contains light source 22 and the optical system used in projecting the image. A condensing lens 30 is also attached to housing 28 near light source 22. A mirror 32 is hingedly attached to housing 28, overlying lens 30.

Figure 2C:
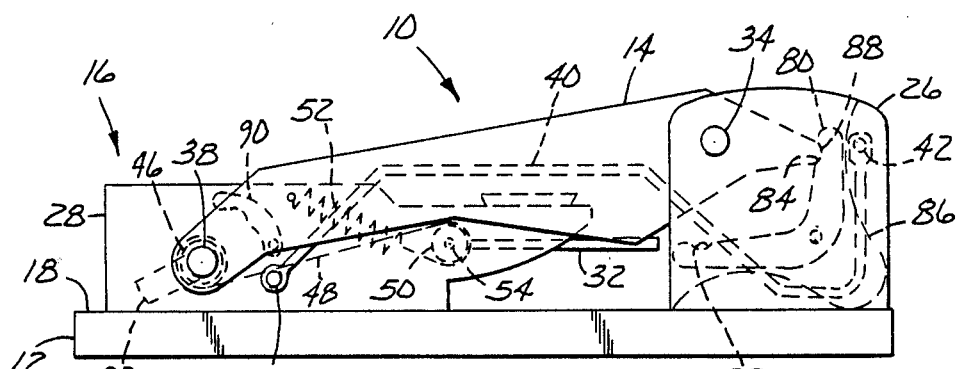

Referring now to FIGS. 2A through 2C, the mechanics of the folding arm 14 are explained. The lower end of folding arm 14 is pivotally connected to mounting block 26 by a first shaft 34 which is attached to mounting block 26 and passes through a hole in arm 14. The upper end of folding arm 14 is also pivotally connected to housing 28 of projector head 16 by a second shaft 36 (visible in FIG. 1) which is integrally attached to arm 14 and passes through a hole in housing 28. Shaft 36 is also connected to and integral with a manual handle 38 (although handle 38 may be allowed to swivel, for reasons which will become apparent).

A second arm or torque member 40 is also attached to mounting block 26 and housing 28. The lower end of torque member 40 curves around and under first shaft 34 and is pivotally connected to mounting block 26 by means of a first rod 42 which passes through a hole in the lower end of torque member 38. The upper end of torque member 38 is pivotally connected to housing 28 by a second rod 44 which is attached to housing 28 and passes through a hole in the upper end of torque member 38. The resulting construction is equivalent to a four-bar linkage, where the first "bar" is mounting block 26, the second bar is folding arm 14, the third bar is torque member 40, and the fourth bar is housing 28.

A four-bar linkage is a common linkage system and requires four bars or members which are pivotally connected head to tail in a closed loop. The relative positions of the four "bars" as shown in the FIG. 2A results in the fourth bar (housing 28) rotating approximately 180° when the second and third bars (arm 14 and member 40) are rotated approximately 90°. In order to achieve this degree of rotation, a bend is necessary in torque member 30 to avoid interference with shaft 34. Rotation occurs in the plane defined by the movement of support arm 14. This action is reflected in FIGS. 2B and 2C. In this manner, when arm 14 is rotated downward, head 16 and arm 14 both end up flush against base 12. The movement of arm 14 is controlled by pushing or pulling handle 38. While four bar linkages are generally known, the particular design and use disclosed herein are both novel and advantageous.

Overhead projector 10 may be provided with latching means to securely hold arm 14 and head 16 in their operative state. As shown in FIG. 2A, a pawl member 80 is pivotally connected to the inside of mounting block 26. Pawl 80 has two indentations 82 and 84 therein, and is in forcible contact with a double-action leaf spring 86. When arm 14 is raised, the tip 88 of arm 14 comes to rest in indentation 82. The force of leaf spring 86 prevents tip 88 from slipping out of indentation 82, except upon the exertion of leveraged force, i.e., pushing at handle 38. This maintains arm 14 in its upright position. Similarly, when arm 14 is folded down, tip 88 mates with indentation 84, which thereby maintains arm 14 and head 16 flush against base 12. This latching mechanism is not critical to the functioning of overhead projector 10 since arm 14 and head 16 are in a state of equilibrium in the upright position. The latching mechanism is, however, preferable since the equilibrium is not stable and a minor perturbation could otherwise cause arm 14 to collapse.

Head 16 is provided with another pawl 90 pivotally attached to the inside of housing 28. Pawl 90 is biased toward shaft 36 by a helical spring (not shown), and has an indentation therein which mates with a cam 92. Cam 92 is attached to and integral with shaft 36. In this manner, when arm 14 is raised, cam 92 will slip into the indentation in pawl 90; this maintains head 16 at the proper inclination in the operative state. Pawl 90 is somewhat redundant since the orientation of head 16 is controlled by the position of support arm 14 and torque member 40, but pawl 90 nevertheless assists the latching of projector head 16 in the operative position. For the sake of clarity, the latching mechanisms have been omitted from FIGS. 2B and 2C.

A further novel feature of the present invention relates to mirror 32. As noted above in the Description of the Prior Art, many portable projectors have a hinged mirror attached to the projector head, but this must be adjusted manually. In the present invention, mirror 32 is automatically flipped up when folding arm 14 is raised, and it is automatically retracted when arm 14 is lowered.

In FIGS. 2A through 2C, the mechanism for adjusting the mirror includes a pulley system which is coupled to folding arm 14. As previously mentioned, second shaft 36 is integrally connected to folding arm 14, but passes into the interior of housing 28. Inside housing 28, shaft 36 terminates in a pulley, or more properly, a spindle 46. This element is not really a pulley since it does not rotate with respect to shaft 36, but rather is fixed thereto. One end of a wire or cord 48 is fastened to the surface of spindle 46. The other end of cord 48 is wrapped around a pulley 50, and connected to a helical spring 52 which is attached to (the inside of) housing 28.

Pulley 50 is integrally attached to a hinge pin 54 which supports mirror 32. Hinge pin 54 is also rotatably attached to housing 28. Accordingly, spring 52 provides a bias force which urges mirror 32 toward its operative (open) state. When projector 10 is collapsed, however, the pulley system as described causes mirror 32 to lower into a storage (closed) state. As handle 38 is pushed and folding arm 14 moves downward, the rotation of head 16 results in rotational movement of spindle 46 with respect to hinge pin 54. This causes cord 48 to wrap around spindle 46, which in turn causes pulley 50, and hence hinge pin 54 and mirror 32, to rotate. For simplicity, the pulley system is depicted in FIGS. 2A and 2B, but not in FIG. 2C. It will also be appreciated that the various shafts, rods and pins discussed herein may be attached to housing 28, arm 14, etc., with the use of bearings, bushings, grease and the like, all of which are omitted from the drawings for simplicity.

Figure 3A:
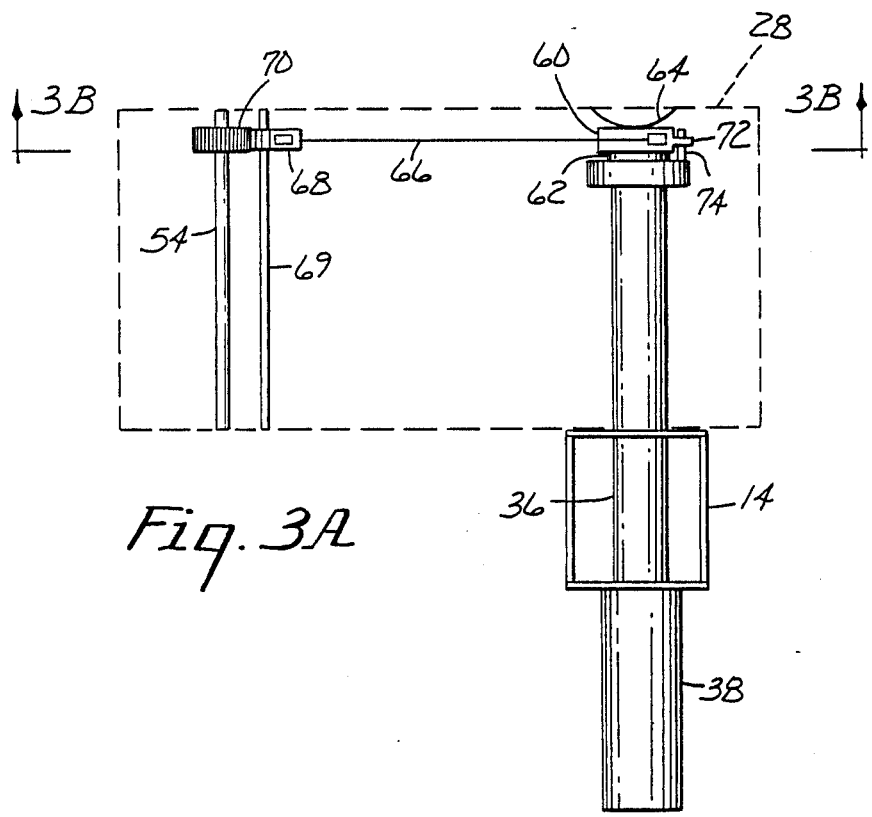
FIG. 3A is a plan view of an alternate mechanism for automatically adjusting the mirror of the projector head, with the head housing shown in dashed lines.
Figure 3B:
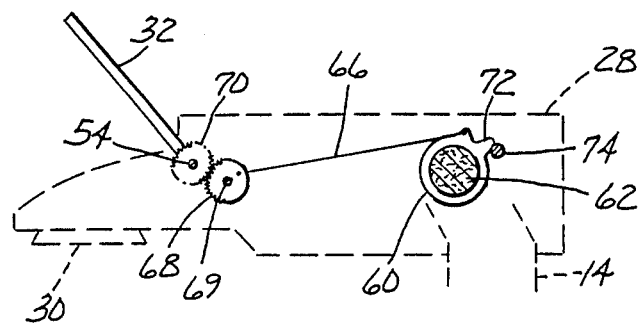
FIG. 3B is a side elevational view of the alternate mechanism taken along lines 3B—3B of FIG. 3A. cl DESCRIPTION OF THE PREFERRED EMBODIMENT With reference now to the figures, and in particular with reference to FIG. 1, there is depicted the portable overhead projector 10 of the present invention. Projector 10 is generally comprised of a base 12, a support arm 14, and a projector head 16. As discussed above in the Description of the Prior Art, overhead projector 10 is a reflective-type projector, meaning that base 12 is relatively thin (e.g., one-half inch), and has a stage area 18 thereon. Stage 18 includes a reflective surface 20 for condensing and directing light upward to projector head 16. In the preferred embodiment, reflective surface 20 is a Fresnel mirror. The folding arm of the present invention is equally useful on transmissive-type projectors, but since an object of the invention is to provide a compact device, only a reflective-type projector is depicted, although this is not necessarily preferable.

With reference now to FIGS. 3A and 3B, an alternative mechanism for adjusting mirror 32 is shown. In this construction, a clutch plate 60 is positioned against shaft 36, with an intervening clutch pad 62. Clutch pad 62 is attached to the terminal end of shaft 36. Bias means 64, such as a Belville spring, is attached to the inner wall of housing 28 and forcibly urges clutch plate 60 against clutch pad 62. One end of a rod or bar 66 is pivotally attached to the periphery of clutch pad 60. The other end of bar 66 is attached to a drive gear 68, which is rotatably connected to (the inside of) housing 28 by means of an axle 69. Drive gear 68 meshes with mirror gear 70 which is supported on hinge pin 54. Mirror 32 (not shown in FIG. 3A for clarity) is still attached to hinge pin 54.

Similar to the action of the pulley system in FIG. 2A, when handle 36 is pushed and arm 14 moves downward, there is relative rotational movement between clutch plate 60 and axle 69. This results in rotation of drive gear 68, which in turn causes mirror gear 70, and hence mirror 32, to also rotate. The design illustrated in FIGS. 3A and 3B is preferable to the design of FIG. 2A, however, since it allows an operator to adjust the inclination of mirror 32 in order to properly project the image on a screen. Such adjustment does not strip the gears 68 and 70 since there is some freedom of movement between clutch plate 60 and clutch pad 62, although the movement is opposed by the frictional force therebetween.

In order to avoid any adverse effects that manual adjustment of mirror 32 might cause, clutch plate 60 is provided with a tine 72. Tine 72 is designed to abut a stop 74 which is attached to the terminal end of shaft 36. This prevents clutch plate 60 from rotating past the point corresponding to the maximum desired inclination of mirror 32.

In practice, mirror 32 is more easily collapsed than opened due to the downward pull of gravity; however, by providing a sufficient bias force in spring 52 (or spring 64), the operator can be assured that the mirror will open when arm 14 is raised above base 12. Those skilled in the art will also appreciate that the mirror adjustment mechanisms require only relative rotational movement between support arm 14 and projector head 16. In other words, they do not necessarily require a four bar linkage, although they are particularly suited therefor. For example, the Liesegang projector discussed in the Description of the Prior Art, which lacks a four bar linkage, could be equipped with either of the mirror adjustment mechanisms described herein.

The operation of overhead projector is straightforward. The collapsed unit is placed on a table or podium, and handle 36 is pulled upward (it may be necessary to hold base 12 firmly against the table). As arm 14 is raised, housing 28 rotates to its operative (horizontal) position, and mirror 32 automatically flips up. Pawls 80 and 90 maintain arm 14 and head 16 in the operative state. The unit is plugged in to a standard electrical outlet, and the power turned on. A transparency is placed on the stage area, and the image projected on the wall or screen. If necessary, mirror 32 may be adjusted to center the image on the screen. After the operator is finished with the presentation, handle 36 is pushed downward. Mirror 32 automatically closes, and head 16 rotates back to its storage position. The unit may then be placed in protective luggage for transportation.

The invention as described herein has several advantages, besides general portability. For example, the 180° rotation of head 16 makes it easier to change the incandescent light bulb therein, since it is more accessible in the collapsed state. Also, automatic adjustment of mirror 32 makes it much less likely that the mirror will accidentally be torn away from head 16, during the collapsing procedure as well as during transportation. Finally, the single step set up and collapsibility enhances the image of the operator as a competent and professional person.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. For example, the four-bar linkage as described herein may be used to raise any object which also needs to be rotated during the lifting operation. In fact, the geometry and dimensions of support arm 14 and torque member 40 may be varied to achieve rotation through nearly any angle. Also, the mechanisms disclosed herein for adjusting mirror 32 have a broader use in automatically opening a door or flap of any enclosure, e.g., a light baffle on photographic equipment. It is therefore contemplated that the appended claims will cover such modifications that fall within the true scope of the invention.

We claim:

1. An apparatus for moving an optical system from a storage position to an operative position, comprising:
   a mounting block;

a support arm;

a torque member;

means for housing the optical system; and means connecting said mounting block, said support arm, said torque member and said housing means whereby, as said support arm is moved from a storage state to an operative state, said housing means moves from the storage position to the operative position, and said housing means simultaneously rotates in the plane defined by the movement of said support arm.

2. The apparatus of claim 1 wherein said connecting means results in a four bar linkage which includes said support arm and said torque member.

3. The apparatus of claim 1 wherein the optical system includes a mirror, and further comprising means for moving said mirror from an operative position to a storage position as said support arm is moved from said operative state to said storage state.

4. The apparatus of claim 1 further comprising means for latching said support arm in said operative state.

5. The apparatus of claim 2 wherein:

said support arm has first and second ends, said first end being pivotally attached to said mounting block, and said second end being pivotally attached to said housing means; and said torque member has first and second ends, said first end of said torque member being pivotally attached to said mounting block, and said second end of said torque member being pivotally attached to said housing means.

6. The apparatus of claim 2 wherein said housing means rotates approximately 180° when said support arm is moved approximately 90°.

7. The apparatus of claim 2 wherein the optical system includes a mirror, and further comprising means for moving said mirror from an operative position to a storage position as said support arm is moved from said operative state to said storage state.

8. The apparatus of claim 2 further comprising means for latching said support arm in said operative state.

9. The apparatus of claim 3 further comprising means for latching said support arm in said operative state.

10. The apparatus of claim 9 further comprising handle means for moving said support arm.

11. An apparatus for conveying an enclosure, having a door member, from a storage position to an operative position, comprising:

a mounting block;

a support arm; and means connecting said mounting block, said support arm, the enclosure and the door member whereby, as said support arm is moved from a storage state to an operative state, the enclosure moves from the storage position to the operative position and the door member simultaneously moves from a closed state to an open state.

12. The apparatus of claim 11 wherein said connecting means includes means for rotating the enclosure in the plane defined by the movement of said support arm, as said support arm is moved from said storage state to said operative state.

13. The apparatus of claim 11 wherein said connecting means comprises a four bar linkage having a torque member.

14. The apparatus of claim 11 further comprising means for latching said support arm in said operative state.

15. The apparatus of claim 12 wherein said connecting means includes pulley means coupled to said door member and said support arm.

16. The apparatus of claim 12 wherein said connecting means includes gear means coupled to said door member and said support arm.

17. The apparatus of claim 16 wherein said connecting means further includes clutch means coupling said gear means to said support arm.

18. An overhead projector comprising:

a base having a stage area;

a mounting block attached to said base;

a support arm having first and second ends, said first end being pivotally attached to said mounting block;

a torque member having first and second ends, said first end of said torque member being pivotally attached to said mounting block, and said torque member being bent to avoid contact with said pivotal attachment of said support arm to said mounting block;

a housing, said second end of said support arm being pivotally attached to said housing, and said second end of said torque arm being pivotally attached to said housing, whereby said mounting block, said support arm, said torque member and said housing form a four bar linkage;

latching means for maintaining said support arm in an upright state; and lens means in said housing for focusing an image placed on said stage area.

19. The overhead projector of claim 18 wherein the projector is a reflective type, and further comprising:

a Fresnel mirror mounted on said stage area;

a light source positioned in said housing which, when energized, directs light toward said stage area; and a mirror hingedly attached to said housing in optical alignment with said lens means.

20. The overhead projector of claim 19 further comprising means for moving said mirror from an operative state to a storage state as said support arm is moved from said upright state to a collapsed state.

* * * * *